US008828111B2

(12) United States Patent
Aycock et al.

(10) Patent No.: US 8,828,111 B2
(45) Date of Patent: Sep. 9, 2014

(54) COLLAPSIBLE FILTER

(75) Inventors: James L. Aycock, Kinston, NC (US);
Timothy Karl Begoske, Brighton, MI (US)

(73) Assignee: Field Controls, LLC, Kinston, NC (US)

( * ) Notice: Subject to any disclaimer, the term of this patent is extended or adjusted under 35 U.S.C. 154(b) by 44 days.

(21) Appl. No.: 13/411,808

(22) Filed: Mar. 5, 2012

(65) Prior Publication Data
US 2012/0227366 A1 Sep. 13, 2012

Related U.S. Application Data

(60) Provisional application No. 61/449,849, filed on Mar. 7, 2011.

(51) Int. Cl.
B01D 41/00 (2006.01)

(52) U.S. Cl.
USPC ............... 55/422; 55/385.2; 55/423; 55/475; 55/492; 55/497

(58) Field of Classification Search
USPC ........... 55/422, 475, 497, 499, 501, 511, 521, 55/DIG. 31, 385.2, 492–493
See application file for complete search history.

(56) References Cited

U.S. PATENT DOCUMENTS

| | | |
|---|---|---|
| 3,871,851 A | 3/1975 | Neumann |
| 4,512,891 A | 4/1985 | Wright et al. |
| 5,252,111 A | 10/1993 | Spencer et al. |
| 5,273,563 A | 12/1993 | Pasch et al. |
| 5,273,564 A | 12/1993 | Hill |
| 5,655,825 A | 8/1997 | Anoszko |
| 5,743,927 A | 4/1998 | Osendorf |
| 5,797,975 A | 8/1998 | Davis |
| 5,837,022 A | 11/1998 | Chapman |
| 5,840,094 A | 11/1998 | Osendorf et al. |
| 5,944,860 A | 8/1999 | Mack et al. |
| 6,007,596 A | 12/1999 | Rosen |
| 6,033,453 A | 3/2000 | Weddell, III |
| 6,152,980 A | 11/2000 | Culwell |
| 6,328,778 B1 | 12/2001 | Richerson et al. |
| 6,592,643 B2 | 7/2003 | Shah et al. |
| 6,599,343 B2 | 7/2003 | Fredrick et al. |
| 6,619,287 B2 * | 9/2003 | Blackhurst et al. ...... 128/205.12 |
| 6,638,333 B2 | 10/2003 | Schuld et al. |
| 6,652,613 B2 | 11/2003 | Shah et al. |
| 6,723,150 B2 | 4/2004 | Parker |
| 6,740,137 B2 | 5/2004 | Kubokawa et al. |
| 6,814,773 B2 | 11/2004 | Shah et al. |
| 6,843,820 B2 | 1/2005 | Kubokawa |
| 6,860,916 B2 | 3/2005 | Kubokawa et al. |
| 6,955,702 B2 | 10/2005 | Kubokawa et al. |
| 7,001,517 B2 | 2/2006 | Gershenson |
| 7,037,354 B1 | 5/2006 | Dimicelli |

(Continued)

Primary Examiner — Jason M Greene
Assistant Examiner — Karla Hawkins
(74) Attorney, Agent, or Firm — Brinks Gilson & Lione

(57) ABSTRACT

A fluid filter having a frame and filter media supported by the frame through which a fluid to be treated is directed. The frame has at least first and second frame assemblies that are reconfigurable to place the filter selectively in: a) a first predetermined operative state; and b) a second predetermined operative state. The frame cooperates with the filter media so that the filter media: i) extends over a first intake area with the filter in the first predetermined operative state; and ii) extends over a second intake area that is different than the first intake area with the filter in the second predetermined operative state.

20 Claims, 11 Drawing Sheets

(56) References Cited

U.S. PATENT DOCUMENTS

| | | |
|---|---|---|
| 7,077,921 B1 | 7/2006 | Dimicelli |
| 7,118,610 B2 | 10/2006 | Lipner |
| 7,150,774 B2 | 12/2006 | Kubokawa et al. |
| 7,169,202 B2 | 1/2007 | Kubokawa |
| 7,252,704 B2 | 8/2007 | Tokar et al. |
| 7,410,520 B2 | 8/2008 | Nowak et al. |
| 7,452,396 B2 | 11/2008 | Terlson et al. |
| 7,497,888 B2 | 3/2009 | Ashwood et al. |
| 7,507,271 B2 | 3/2009 | Caesar et al. |
| 7,513,933 B2 | 4/2009 | Coppom et al. |
| 7,537,630 B2 | 5/2009 | Schuld et al. |
| 7,758,667 B2 | 7/2010 | Ashwood et al. |
| 7,776,123 B2 | 8/2010 | Lawrence |
| 7,959,699 B2 | 6/2011 | Privitt et al. |
| 8,021,454 B2 | 9/2011 | Braunecker et al. |
| 2004/0182055 A1* | 9/2004 | Wynn .............................. 55/497 |
| 2005/0044829 A1 | 3/2005 | Chase |
| 2008/0066436 A1 | 3/2008 | Magee et al. |
| 2009/0077937 A1* | 3/2009 | Privitt et al. ..................... 55/493 |
| 2009/0301044 A1 | 12/2009 | Miller et al. |

* cited by examiner

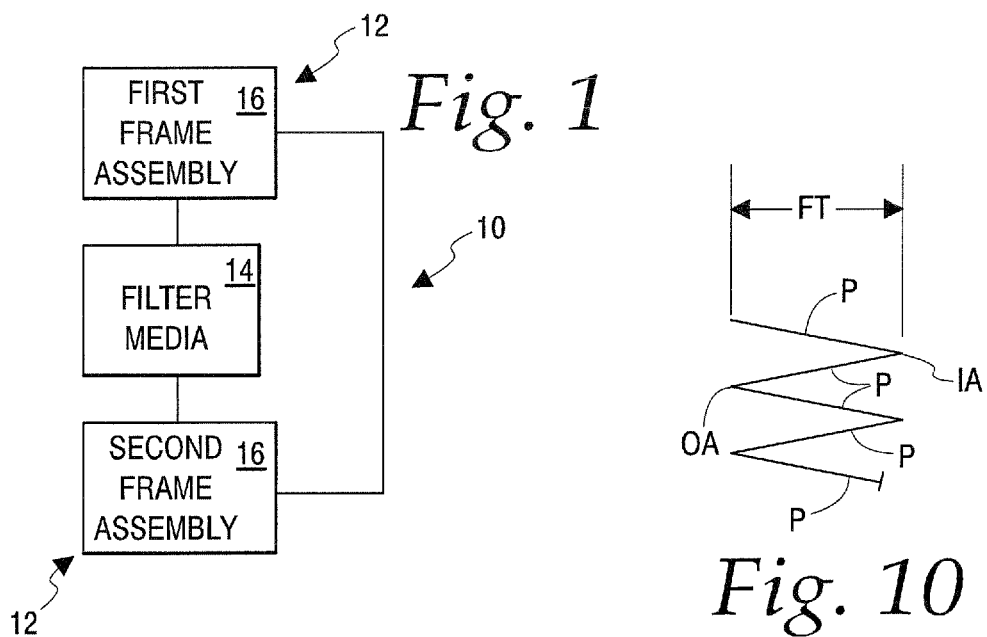
Fig. 1
Fig. 10
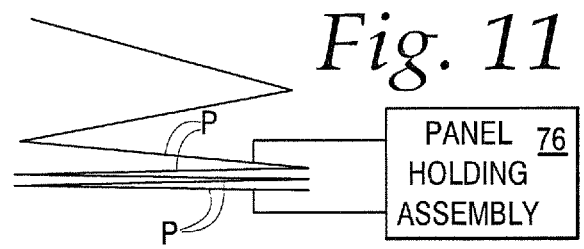
Fig. 11
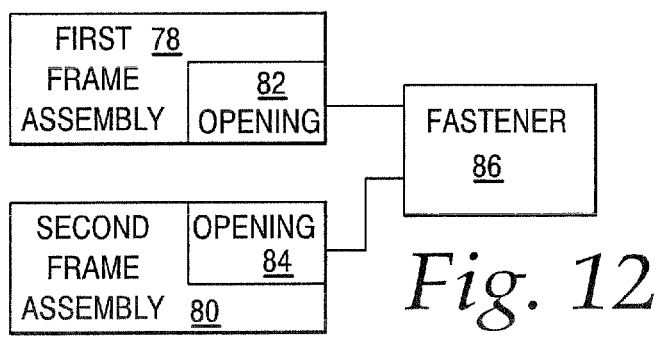
Fig. 12
Fig. 13

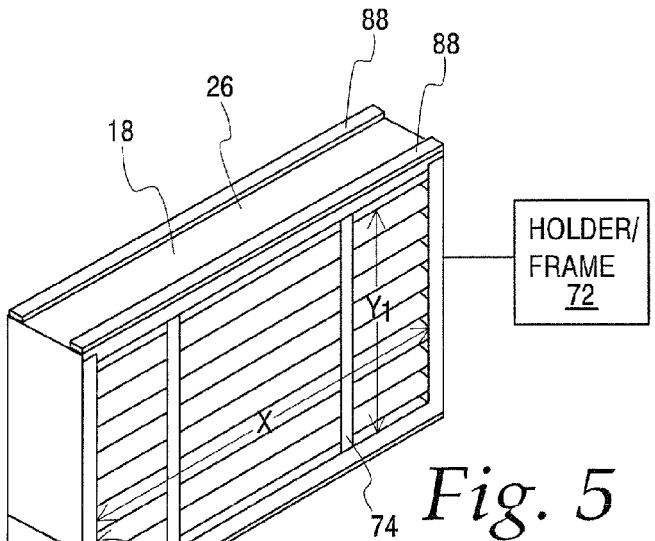
*Fig. 5*
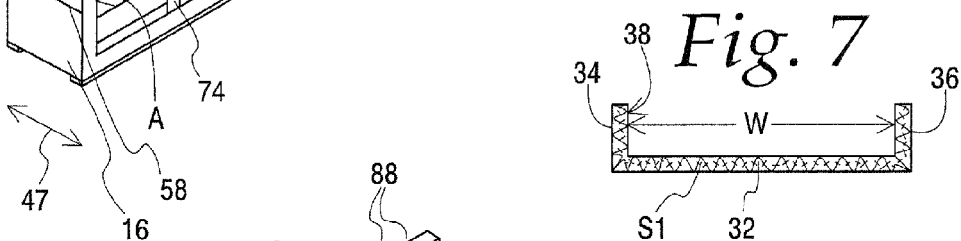
*Fig. 7*
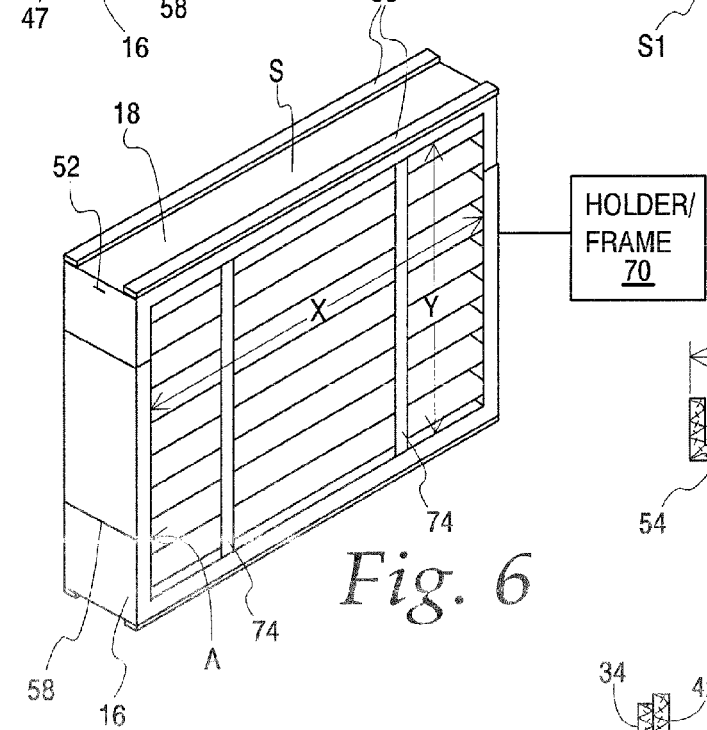
*Fig. 6*
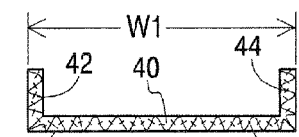
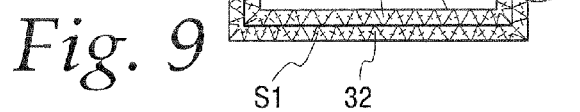
*Fig. 8*
*Fig. 9*

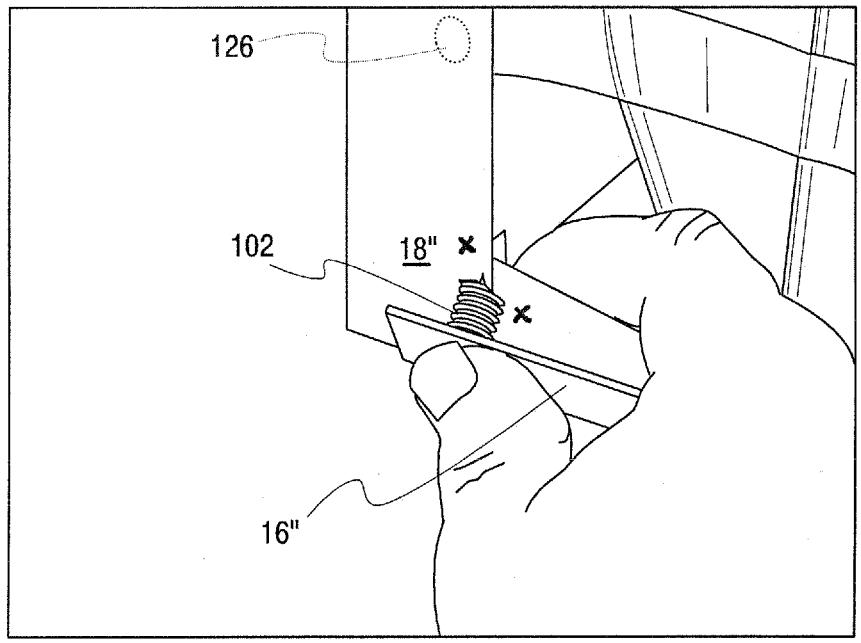
Fig. 20
Fig. 21
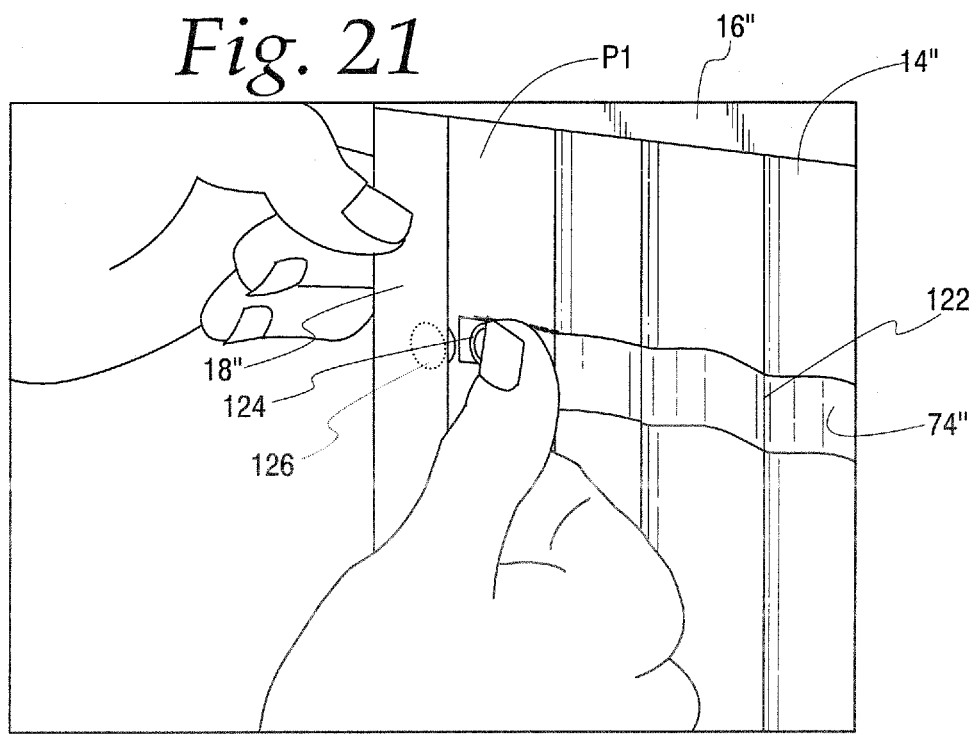

COLLAPSIBLE FILTER

CROSS-REFERENCE TO RELATED APPLICATIONS

This application is a non-provisional of U.S. application No. 61/449,849 filed Mar. 7, 2011.

BACKGROUND OF THE INVENTION

1. Field of the Invention

This invention relates to filters and, more particularly, to a filter having a media component through which a fluid is passed and a frame for operatively mounting the filter.

2. Background Art

A multitude of components that treat fluids, such as air, exists in both residential and commercial environments. Different types of air treatment units abound and incorporate filters that are removable for cleaning and/or replacement. Within this category of products utilizing filters are air cleaners, heaters, coolers, etc.

Fresh or return air is caused to flow through filter media that intercepts and retains airborne particles. The filter media is commonly mounted in a frame that is designed to be conveniently placed operatively into a holder and removed therefrom for cleaning or replacement. These filters are generally designed to span the full areal extent of the intake region on the associated unit so as to not significantly block intake capacity while at the same time causing substantially all of the incoming air to be intercepted by the filter media.

Residential and industrial air treatment units often have a relatively large intake capacity, thereby necessitating that the filter media span continuously over a large area. The nature of the filter media and its form in the filters vary greatly. However, most commonly the filter media is lightweight and readily reconfigurable. As one example, sheets of material may be formed with accordion folds that effectively increase the filter contact area for incoming air. Other materials may be made with a honeycomb-type structure, or may be formed in a flat shape or otherwise.

The flexibility of the filter media generally makes it necessary that it be integrated into a frame that maintains shape and facilitates operative mounting of the filter within a complementary holder at an air intake location. Typically, the frame will surround the entire periphery of the filter media and extend around an area at least as great as the intake area for the associated unit. The frame thus determines the overall dimensions of the filter.

Virtually all commercial filters of the above type are made with a fixed configuration. While this fixed configuration affords a convenience in terms of handling the filter during installation and removal, it presents other problems common to "bulky" products.

One significant problem with these filters is attributable to their large size and their particular construction. Ideally, there is no obstructing component that blocks passage of air through the filter media aligned over an intake opening. As a consequence, the filter rigidity is attributable primarily to the peripheral frame. Since ideally the frame is made from lightweight and inexpensive or recyclable materials, the frame has a tendency to twist and bend when exposed to even relatively modest external forces. This property makes the filters prone to being damaged at times when the filters are being stored and transported. The weight of the filter itself may cause distortion if the filter is not adequately supported. This distortion may lead to a permanent set that changes the shape of the filter significantly enough that it may be difficult or impossible to conform the same to an accommodating holder.

As noted above, these fixed configuration filters may have a large overall volume. Bulk transportation may become difficult and/or expensive. If quantities of the filters are placed in master cartons, the cartons become large if any significant quantities of the filters are to be placed therein. The master cartons then become awkward to handle and difficult to store, not due to their weight, but rather to their overall size. As a result, shipping and handling costs may be sufficiently high that, when passed on to the consumer, the overall cost of each individual filter is appreciably and undesirably increased.

If the master cartons are made with adequate rigidity, the cartons themselves may become expensive. If the cartons are inadequately rigid, the filters are prone to being damaged as by being bent, twisted, or ruptured.

Handling of large cartons also has an adverse environmental impact. Aside from using a substantial amount of space in transportation vehicles, and thus accounting for significant fuel usage, the containers must be disposed of after use.

Another problem with a fixed configuration filter is that it will cooperate with only a single size holder. While the industry has standardized size for filters to a certain extent, there remains a demand for a number of differently sized "standard" filters. For those businesses selling the filters, demand for each different filter size must be estimated. At times, this is just an exercise of chance whereby there inevitably will result shortages of some sized filters and excesses of others.

At point of sale, and/or in staging areas, excess inventory for each filter size may be kept on hand to avoid shortages. Valuable space may be taken up by these filters on display racks and in warehouses.

A number of collapsible filter designs are disclosed in U.S. patents. The objective of these designs is to address some or all of the above-noted problems. However, for designs to be commercially feasible, they must be cost efficient to manufacture. At the same time, the collapsible designs must be user friendly. Consumers are currently accustomed to purchasing and handling filters in their final configuration so that assembly and removal each involves a simple translational movement relative to a holder. Complicated steps to convert a filter from a collapsed state into an operative state would make such a product commercially undesirable.

Further, it is important that the integrity of the filter, with a collapsing capability, be maintained, in each of its potentially multiple configurations.

To date, many of these objectives have been competing to the point that no commercially viable product has been devised. The industry continues to seek out affordable alternatives that address the limitations in the existing filter art.

SUMMARY OF THE INVENTION

In one form, the invention is directed to a fluid filter having a frame and filter media supported by the frame through which a fluid to be treated is directed. The frame has at least first and second frame assemblies that are reconfigurable to place the filter selectively in: a) a first predetermined operative state; and b) a second predetermined operative state. The frame cooperates with the filter media so that the filter media: i) extends over a first intake area with the filter in the first predetermined operative state; and ii) extends over a second intake area that is different than the first intake area with the filter in the second predetermined operative state.

In one form, the first and second frame assemblies are reconfigurable by guidingly sliding one against the other to thereby change the filter between the first and second operative states.

In one form, the first and second frame assemblies are reconfigurable to place the filter in a predetermined collapsed state.

In one form, a first part of one of the first and second frame assemblies is bent in a predetermined manner relative to a second part of the one of the first and second frame assemblies to reconfigure the one of the first and second frame assemblies to change the frame from one of the first, second and collapsed states into another of the first, second and collapsed states.

In one form, the first and second frame assemblies each has a "U" shape with the "U" shapes on the first and second frame assemblies opening oppositely.

In one form, there are discrete components on the first and second frame assemblies that cooperate with each other with the first and second frame assemblies in a first relative position with the filter in one of the first and second operative states.

In one form, the filter media has a pleated configuration with a plurality of panels folded in accordion style. The fluid filter further has a panel holding assembly to maintain a plurality of the panels together.

In one form, the pleated configuration defines apices extending along generally parallel lines. The fluid filter has at least one spacing component that spans across and is connected to a plurality of the apices.

In one form, the at least one component is elastically extendible in a line transverse to the parallel lines along which the apices extend.

In one form, the at least one spacing component is connected to each of the first and second frame assemblies.

In one form, the first and second frame assemblies cooperatively extend continuously around intake areas with the filter in each of the first and second operative states and the collapsed state.

In one form, one of the first and second frame assemblies has a starting "U" shape with a base and spaced arms and with the filter in the collapsed state the one of the first and second frame assemblies is reconfigured from the starting "U" shape by bending one of the arms relative to the base to reside against the other of the first and second frame assemblies.

In one form, with the filter in the collapsed state the one of the first and second frame assemblies is reconfigured from the starting "U" shape by bending each of the arms relative to the base to reside against the other of the first and second frame assemblies.

In one form, one of the first and second frame assemblies has joined sections each with a length and at least one of the sections has a U-shaped cross-sectional configuration taken transverse to its length defined by a base wall and spaced side walls. A part of the other of the first and second frame assemblies resides between the spaced side walls with the filter in at least one of the first and second operative states.

In one form, the part of the other of the first and second frame assemblies has a cross-sectional configuration, between the spaced side walls and taken transversely to the length of the at least one section, that is U-shaped.

In one form, an adhesive component with a peel-off backing can be used to bond the first and second frame assemblies together.

In one form, the frame has an outer peripheral surface. At least one gasket component is applied to the outer peripheral surface.

In one form, one of the first and second frame assemblies is made from a semi-rigid material with fold lines that allow the one of the first and second assemblies to be reconfigured by being bent in a predetermined manner.

In one form, there are discrete openings on the first and second frame assemblies that align with the first and second frame assemblies in a first relative position, with the filter in one of the first and second operative states, so as to accept a fastener.

In one form, the frame has a peripheral surface and the peripheral surface has a different length with the filter in each of the first and second operative states and the collapsed state.

BRIEF DESCRIPTION OF THE DRAWINGS

FIG. 1 is a schematic representation of one form of fluid filter, according to the present invention, and consisting of first and second frame assemblies and filter media supported by the frame assemblies;

FIG. 5 is a view as in FIGS. 3 and 4 wherein the filter is in a first operative state;

FIG. 6 is a view as in FIGS. 3-5 wherein the filter is in a second operative state;

FIG. 7 is an enlarged, cross-sectional view of a section of one of the frame assemblies taken along line 7-7 of FIG. 2;

FIG. 8 is an enlarged, cross-sectional view of a section on the other of the frame assemblies taken along line 8-8 of FIG. 2;

FIG. 9 is an enlarged, cross-sectional view of the cooperating sections in FIGS. 7 and 8 taken along line 9-9 of FIG. 4;

FIG. 10 is an enlarged, fragmentary, side elevation view of the filter media on the filter in FIGS. 2-9 and made up of panels joined to produce accordion folds;

FIG. 11 is a view as in FIG. 10 wherein a panel holding assembly is used to maintain a plurality of the panels together;

FIG. 12 is a schematic representation of cooperating frame assemblies, according to the invention, that are maintained in different relative positions utilizing a fastener;

FIG. 13 is a schematic representation of one form of filter media as used in the present invention and incorporating a mesh support;

FIGS. 18-20 show sequentially steps being performed on the fluid filter to change it from the FIG. 14 state into the FIG. 15 state;

FIGS. 21 and 22 show the steps performed to change the fluid filter from the FIG. 15 state into the FIG. 16 state.

DETAILED DESCRIPTION OF THE PREFERRED EMBODIMENT

Figure 2:
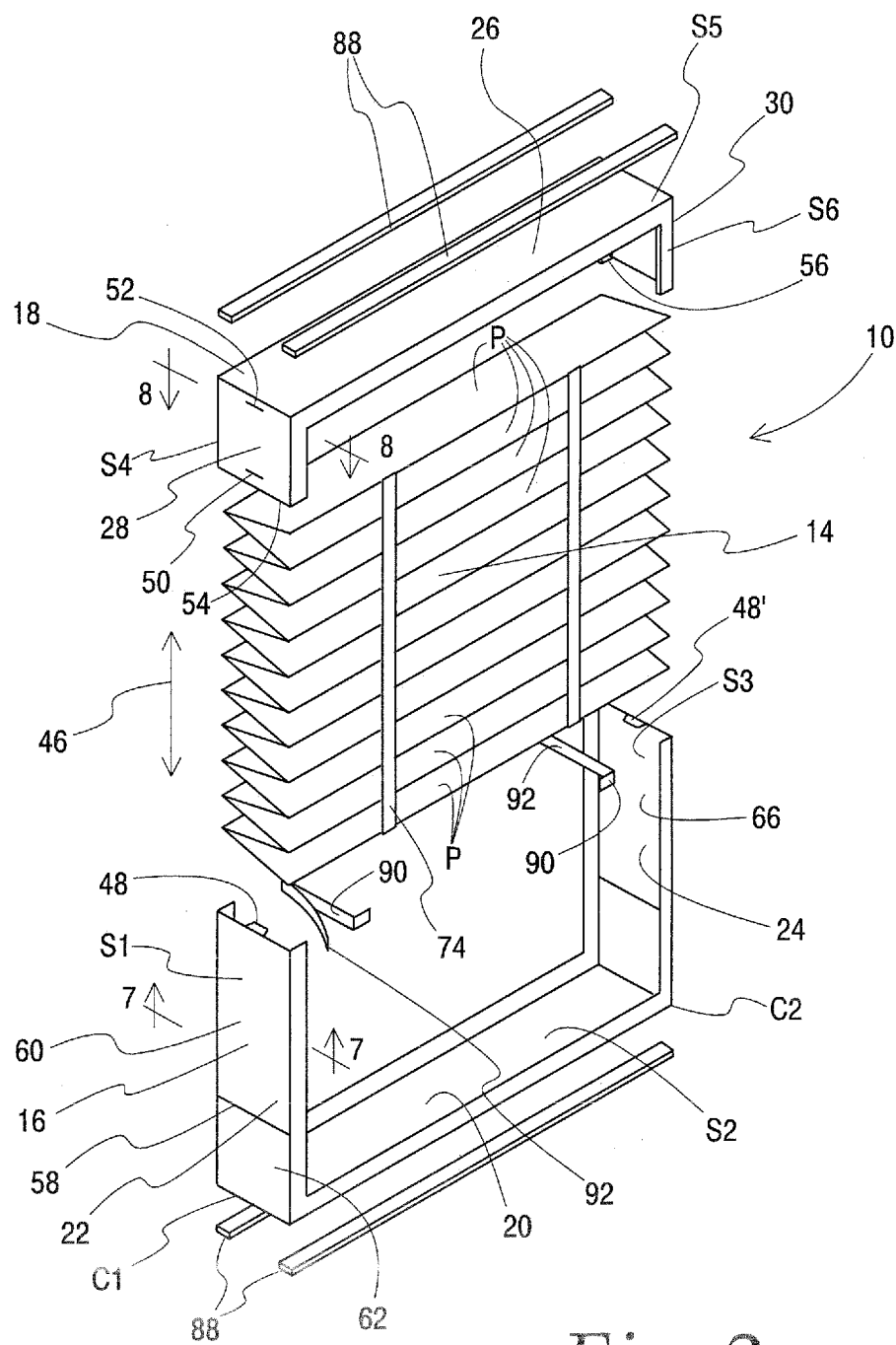
FIG. 2 is an exploded, perspective view of one specific form of fluid filter as shown in FIG. 1.

In FIG. 1, a fluid filter, according to the present invention, is shown schematically at 10. The fluid filter 10 consists of a frame 12 and filter media 14 supported by the frame 12 through which a fluid to be treated is directed. The inventive filter 10 is particularly suited to filtering air; however, its intended utility is not so limited.

The frame 12 is made up of at least first and second frame assemblies 16, 18, respectively, that are reconfigurable to place the filter selectively in: a) a first predetermined operative state; and b) a second predetermined operative state. "Reconfiguration", as used herein, is intended to encompass a change in the separate frame assemblies 16, 18, as well as their particular interaction.

The frame 12 cooperates with the filter media 14 so that the filter media 14: a) extends over a first intake area with the filter 10 in the first predetermined operative state; and b) extends over a second intake area that is different than the first intake area with the filter 10 in the second predetermined operative state.

In one form, the first and second frame assemblies 16, 18 are reconfigurable to place the filter 10 selectively in a collapsed state, that is different than the first and second operative states.

The filter 10 is shown schematically in FIG. 1 to encompass one preferred form thereof, as described below, and additionally filters with variations therefrom that would be readily derived by one skilled in the art based upon the disclosure herein.

Referring now to FIGS. 2-6, one specific form of the fluid filter is shown at 10 incorporating the aforementioned filter media 14 and first and second frame assemblies 16, 18, respectively.

The first frame assembly 16 has a starting overall "U" shape with a base 20 and spaced arms 22, 24 projecting in parallel alignment away from the base 20 so as to produce in conjunction with the base 20 the "U" shape.

The second frame assembly 18 has a corresponding "U" shape with a base 26 and arms 28, 30 projecting in spaced, parallel alignment away therefrom so as to define in conjunction with the base 26 the "U" shape.

Figure 3:
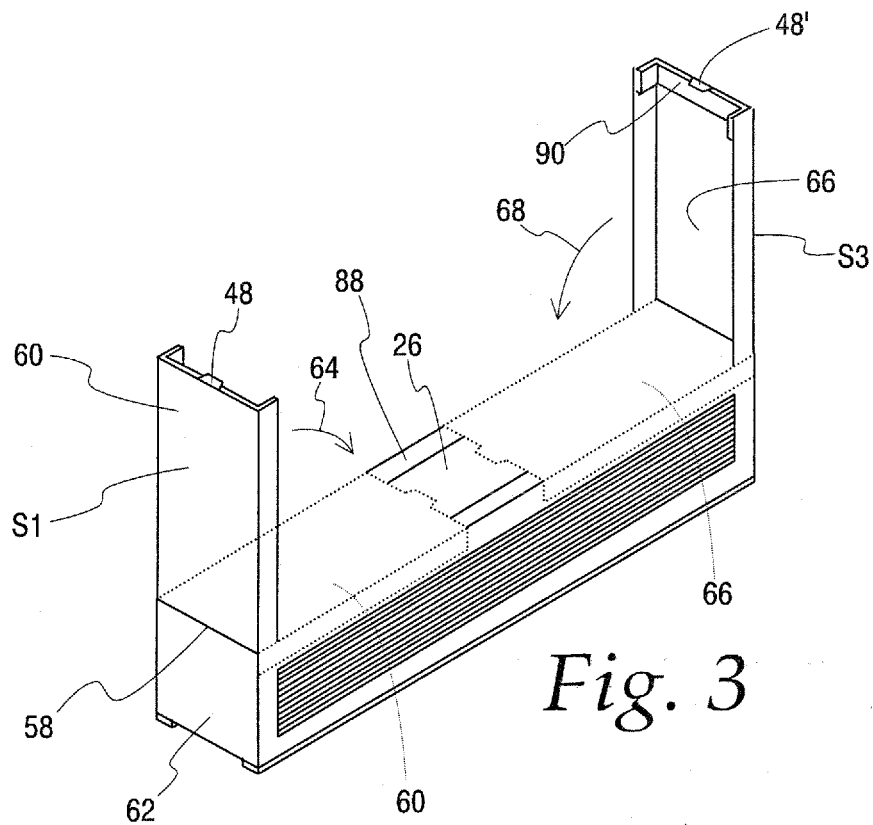
FIG. 3 is a perspective view of the filter in FIG. 1 in a collapsed state.

The frame assemblies 16, 18 are reconfigurable in one manner by sliding guidingly, one against the other, to thereby change the filter 10 between the first and second different operative states, shown in FIGS. 5 and 6, and the collapsed state shown in FIG. 3.

In this embodiment, the "U" shapes of the frame assemblies 16, 18 open oppositely and towards each other.

The first frame assembly 16 consists of elongate sections S1, S2, S3 joined at lengthwise ends to produce the "U" shape for the frame assembly 16.

The second frame assembly 18 has sections S4, S5, S6 joined in the same manner as the sections S1, S2, S3. The frame assemblies 16, 18 have a similar overall configuration, with exemplary frame assembly 16 described in detail hereinbelow.

The first frame assembly 16 is made from stock with a U-shaped cross-sectional configuration, as viewed in section taken transversely to the length of any of the sections S1, S2, S3. This stock material may be locally cut, or weakened in conventional manner so that it can be bent to produce right angle corners C1, C2.

As seen in FIG. 7, the exemplary section S1 has a base wall 32 and spaced side walls 34, 36 between which a guide space 38 for the section S4 on the frame assembly 18 is defined. The guide space 38 has a width W.

As shown in FIG. 8, the section S4 has a similar U-shaped cross-sectional configuration viewed in section transverse to its length. The "U" is defined by a base wall 40 and spaced side walls 42, 44. The overall width W1 of the section S4 is slightly less than the width W so that a part of the section S4 can nest between the side walls 34, 36 on the section S1, as shown in FIG. 9.

With the described arrangement, the base walls 32, 40 are guided, one against the other, as the frame assemblies 16, 18 are operatively engaged and selectively reconfigured by being moved relative to each other in opposite directions parallel to a line indicated by the double-headed arrow 46 (FIG. 2). Relative widthwise movement, parallel to a line indicated by the double-headed arrow 47 (FIG. 5), is restricted between the sections S1, S4 by reason of the interaction of the walls 42, 44 on the section S4 with the walls 34, 36, respectively, on the section S1

The sections S3, S6 cooperate in like fashion so that the sections S1, S4 and S3, S6 cooperate at the same time to guide movement of the frame assemblies 16, 18 between the relative positions shown in FIGS. 3 and 6.

The frame assemblies 16, 18 are movable from an aligned, but separated, state in FIG. 2 towards each other along the line indicated by the double-headed arrow 46 until initially the FIG. 6 configuration results. Discrete components 48, 50, respectively on the frame assemblies 16, 18, cooperate to consistently maintain the frame assemblies 16, 18 in the predetermined relative positions shown in FIG. 6. Like components (one shown at 48') cooperate in similar fashion on the sections S3, S6.

More particularly, the component 48 is in the form of an elongate tab, with the component 50 in the form of a slot to receive the tab 48. As the frame assemblies 16, 18 are moved towards each other from the FIG. 2 position, the elongate tab 48 eventually registers with the slot 50 and presses into the slot 50 to arrest further relative movement between the frame assemblies 16, 18. In this releasably fixed configuration, the frame bounds an intake area A with a width dimension X and a height dimension Y.

By moving the frame assemblies 16, 18 further towards each other along the line indicated by the double-headed arrow 46, from the FIG. 6 configuration, the tab 48 moves out of the slot 50 and eventually registers with, and presses into, a similar discrete slot 52 on the section S4. The tab 48' cooperates with a like slot (not shown) on the section S6 in similar fashion. This releasably maintains the frame assemblies 16, 18 consistently in the predetermined FIG. 5 configuration wherein the intake area has the same dimension X but a transverse dimension Y1 that is less than the dimension Y in FIG. 6.

Figure 4:
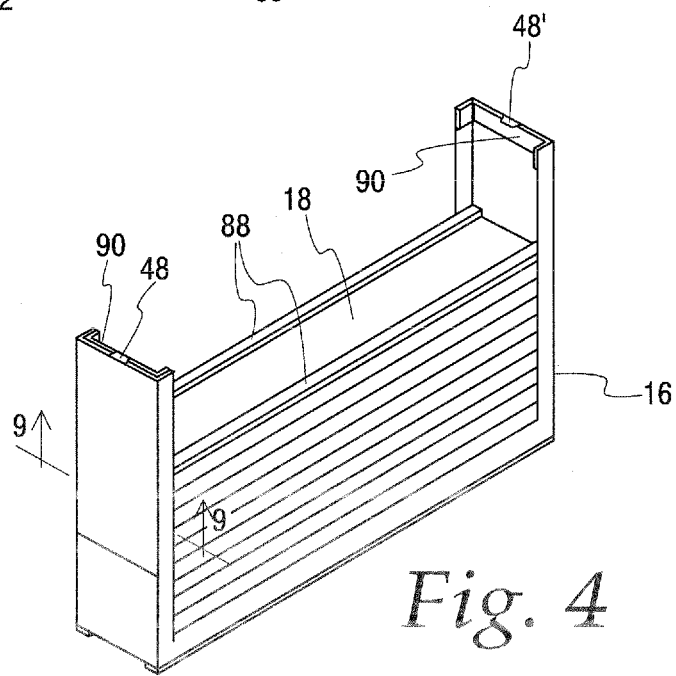
FIG. 4 is a view as in FIG. 3 wherein the filter is being transitioned towards an operative state.

By continuing to press the frame assemblies 16, 18 towards each other along the line indicated by the double-headed arrow 46, the frame assemblies 16, 18 transition through a state wherein they have the relative positions shown in FIG. 4, and ultimately into the FIG. 3 state wherein they are relatively positioned so that the free ends 54, 56 of the sections S4, S6, respectively, abut to the base 20 on the frame assembly 16.

The section S1 has a live hinge 58 that allows a first part 60 of the section S1 to be bent in a predetermined manner relative to a second part 62 on the section S1 and the base 20. This allows the section S1 to be folded in the direction of the arrow 64 to against the base 26 of the frame assembly 18 so as to assume the dotted line position shown in FIG. 3.

A corresponding first part 66 on the section S6 is folded in the direction of the arrow 68 in FIG. 3 to the dotted line position, thereby to place the filter 10 in a fully collapsed state.

The filter media 14 is configured to be surroundingly engaged by the frame 12. The filter media 14 is shown to have a pleated configuration with a series of panels P joined together and folded in accordion fashion relative to each other to define fold locations that produce elongate, parallel, inside/downstream and outside/upstream apices IA, OA, respectively. The apices IA, OA are spaced from each other to define a filter thickness FT that fits within the space between the walls 42, 44 of the section S4, the walls 34, 36 of the section S1, and corresponding walls on the other sections S2, S3, S5 and S6.

The endmost panels P on the filter media 14 are connected, as by an adhesive, to the bases 20, 26 on the frame assemblies 16, 18, to follow movement thereof.

With the frame assemblies 16, 18 in the FIG. 6 configuration, the filter 10 has a first operative state with the perimeter dimensions of the frame 12 designed to be received in a complementary holder/frame 70. For example, the filter 10 in FIG. 6 may have a standard perimeter dimension of 20 in.×25 in.

By reconfiguring the frame assemblies 16, 18 from the FIG. 6 configuration to the FIG. 5 configuration, the filter 10 will have a dimension to fit a holder/frame 72 with a different dimension. For example, the perimeter dimensions of the filter in FIG. 5 may be 16 in.×25 in., which is another standard industry size.

The nature of the composition of the filter media 14 may be such that it will function acceptably with the filter 10 in each of the different operative states shown in FIGS. 5 and 6 without making any accommodation for the fact that the panels P have a different folded relationship. That is, even though the filter media 14 may be compacted into a smaller volume in FIG. 5 than in FIG. 6, it still may perform acceptably.

In the embodiment shown, separate, and substantially parallel, spacing components 74 span across and are connected to each of the spanned apices IA and/or OA. The spacing components 74 connect also to each of the bases 20, 26. The spacing components 74 may be elastic so as to thereby accommodate the change in filter media configuration between the different operative states in FIGS. 5, and 6 and maintain even spacing between the panel apices in both states.

Alternatively, as shown in FIG. 11, a panel holding assembly 76 may be utilized to maintain a plurality of the collected panels P together with the filter 10 in the FIG. 5 state so that the remaining panels P have substantially the same relationship that they have in FIG. 6. The panel holding assembly 76 may be in the form of clips that may be selectively removed, as at an end user site. For example, the clips might be initially installed to use the filter 10 in the operative state of FIG. 5. If it is desired to use the FIG. 6 operative state, the clips can be removed at the installation state. Alternatively, the filter 10 can be designed so that the clips automatically pop off as the filter media 14 is expanded from the FIG. 5 size configuration to that in FIG. 6.

As a further alternative, an adhesive, or fasteners, such as hook-and-loop type might be used to secure panels P together at one or both of the bases 20, 26.

When not in use, the filter 10 can be placed in the compact collapsed state of FIG. 3. With a resulting reduced overall volume, the filter 10 can be conveniently and efficiently stored and transported.

By simply relatively moving the frame assemblies 16, 18, the filter 10 can be changed from the predetermined collapsed state into either of the predetermined operative states shown in FIGS. 5 and 6. The tabs 48 can be made sufficiently flexible that they will release to allow the change of state without the need to exert an excessive force upon the frame assemblies 16, 18. The tabs 48 do not have to be highly rigid to consistently maintain the different predetermined operative states for the filter 10 as the filter 10 will not be subjected to any significant forces tending to relatively reposition the frame assemblies 16, 18 once the filter is operatively in place on a holder/frame 70, 72.

With the filter 10 in each of the different operative states and the collapsed state, the frame assemblies 16, 18 cooperatively extend continuously around the intake areas A. An exposed peripheral surface S, defined by the frame assemblies 16, 18, has different lengths with the filter 10 in each of the operative states and the collapsed state.

Using the basic teachings described above, many variations in the basic structure can be made, only some of which will be described hereinbelow.

As shown in FIG. 12, as an alternative to using a reconfigurable tab 48, corresponding first and second frame assemblies 78, 80 may be provided with openings 82, 84, respectively, that are alignable to accept a separate fastener 86.

Other types of releasable, cooperating components might be used, as would be derivable by one skilled in this art. For example, clips, interlocking tabs, flanged protrusions punched through the mating parts, etc., might be used.

Lengths of a double-sided adhesive component 90 with peel-off backing layers 92 might alternatively be utilized to secure the frame assemblies 16, 18 to each other in the desired relationship, either at the point of manufacture or at the end user location.

To avoid bypassing of the filter media by the incoming fluid, one or more gaskets 88, made from sealing material such as foam, may be applied to the exposed outer peripheral surface S of the frame 12. The gaskets 88 also allow for clearance to be maintained between the frame 10 and cooperating holder/frame 70, 72 to aid removal of the frame 10.

As shown in FIG. 13, the filter media 14 may have an expanded metal mesh support 94 bonded to its downstream side, thereby providing support and bridge strength to the filter media 14. This mesh support 94 is optional. It is also anticipated that a composition of the filter media 14 may be developed in the future so that the requisite support and bridge strength are built into the filter media without any separate component.

While a filter media 14 is shown with panels P joined to produce accordion folds, other types of media, that are reducible in volume between the relatively moved frame assemblies 16, 18, are contemplated. Virtually any media that will reduce in volume under a compressive force can be used. For example, a foam-like material might be used. Alternatively, different constructions of the material may be utilized, such as those incorporating honeycomb patterns, etc.

While two different operative states are shown for the filter 10 to adapt to common, standard holders, additional operative states might be permitted, potentially allowing even multidirectional size variation.

The nature of the frame composition is not critical to the present invention. As one example, the frame 10 might be made from cardboard or other similar foldable semi-rigid material. Hinged components made from molded or extruded plastic, or other rigid material, might be used as well.

The separation between the apices/pleats IA, OA may be maintained by utilizing ribbons or cords or multiple ribbons or cords joined at the apices, preferably at the upstream side. Alternatively, diagonal rods may be provided, potentially piercing the filter media 14 to maintain a relationship therewith. Such rods may have pivoting attachments to the frame bases 20, 26 and could overlap on their free ends, allowing expansion of, and providing a support for, the media.

As a further alternative, pivoting or folding combs could be utilized such as are commonly used for pleat separation in the industry.

A modified form of fluid filter, according to the invention, is shown at 10" in FIGS. 14-17. The fluid filter 10" is constructed similarly to the fluid filter 10, with certain exceptions as described hereinbelow. Parts on the fluid filter 10" will be identified hereinbelow with the same reference numerals used to identify corresponding components on the fluid filter 10, with the exception that a """ designation will be added to the reference numerals for the components of the fluid filter 10".

One difference between the fluid filter 10" and the fluid filter 10 is that the fluid filter 10" uses an alternative to the tab and slot arrangement to maintain the different configurations for the fluid filter 10" in FIGS. 14-17. Instead, the first and second frame assemblies 16", 18" are held together using conventional, press-fittable "tree clips" 102, often commonly referred to as push-in plastic rivets. The clips/rivets 102 have an enlarged, flat head 104 and a threaded shank 106 with a sharply pointed free end 108. Holes 110 are strategically provided on the frame assemblies 16", 18" and are registrable to accept the clips/rivets 102 that can be hand pressed therethrough. The holes 110 have a diameter that is less than that of the shanks 106. By forcing the shanks 106 through the holes 110, the clips/rivets 102 become frictionally held in place. The use of the clips/rivets 102 generally provides more precise dimensionality and more positive localized holding of the separate frame assemblies 16", 18", one against the other.

Figure 14:
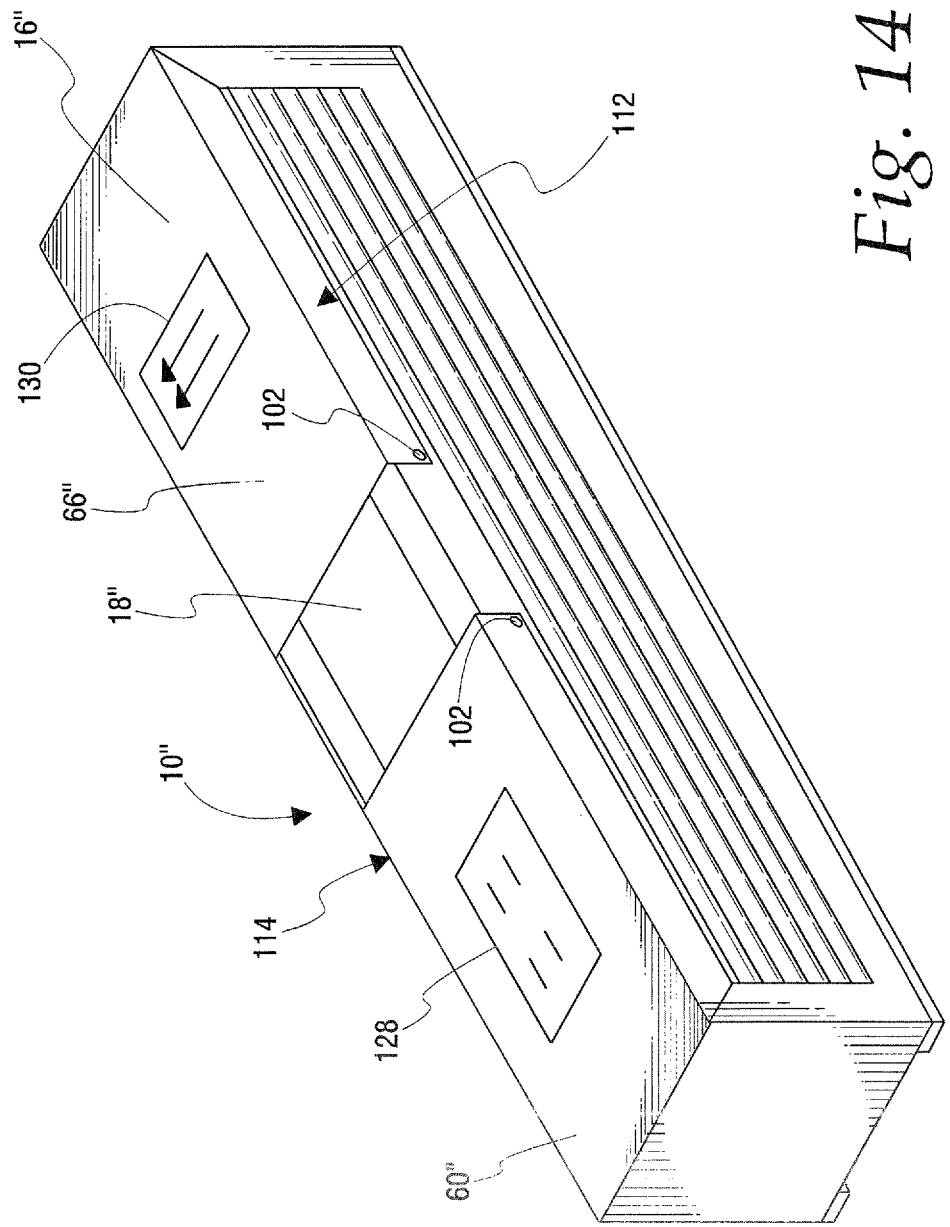
FIG. 14 is a perspective view of a modified form of fluid filter, according to the invention, and in a state corresponding to the collapsed state for the filter in FIG. 3.

With the fluid filter 10" in a collapsed state, as shown in FIG. 14, and corresponding to the collapsed state for the fluid filter 10 in FIG. 3, at least four clips/rivets 102 are preferably utilized. Two clips/rivets 102 are shown in FIG. 14 on one side 112, of the fluid filter 10", with correspondingly located clips/rivets 102 (not shown) situated on the opposite side 114 of the fluid filter 10".

Figure 15:
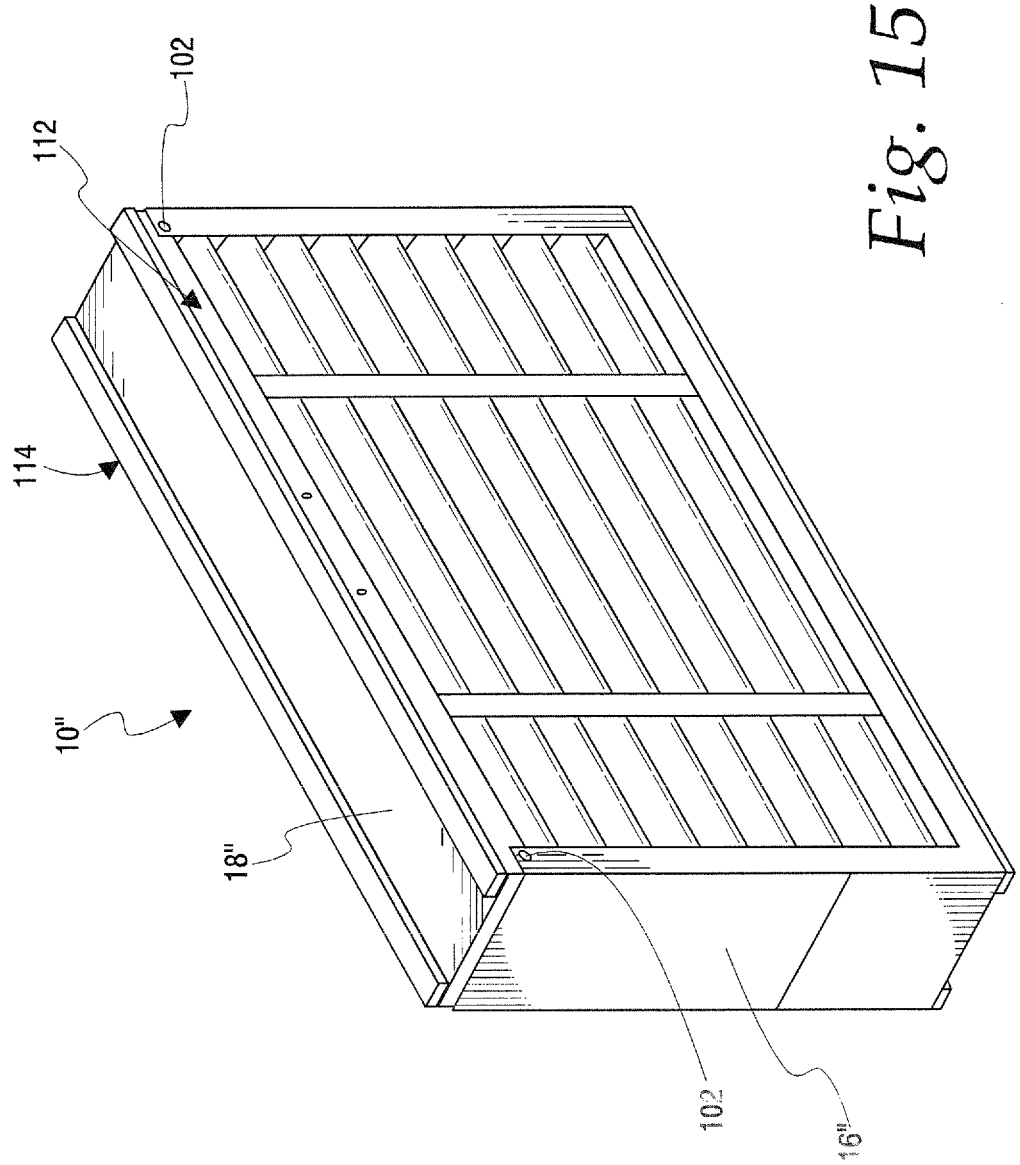
FIG. 15 is a view as in FIG. 14 wherein the fluid filter is changed into a first operative state corresponding to the first operative state for the filter in FIG. 5.

FIG. 15 shows the fluid filter 10" in a first operative state, corresponding to the first operative state for the fluid filter 10 in FIG. 5. In this configuration, at least four clips/rivets 102 are preferably utilized, with two clips/rivets 102 provided, one each, at the upper corners on the side 112, with a similar arrangement of clips/rivets 102 on the opposite side 114.

Figure 16:
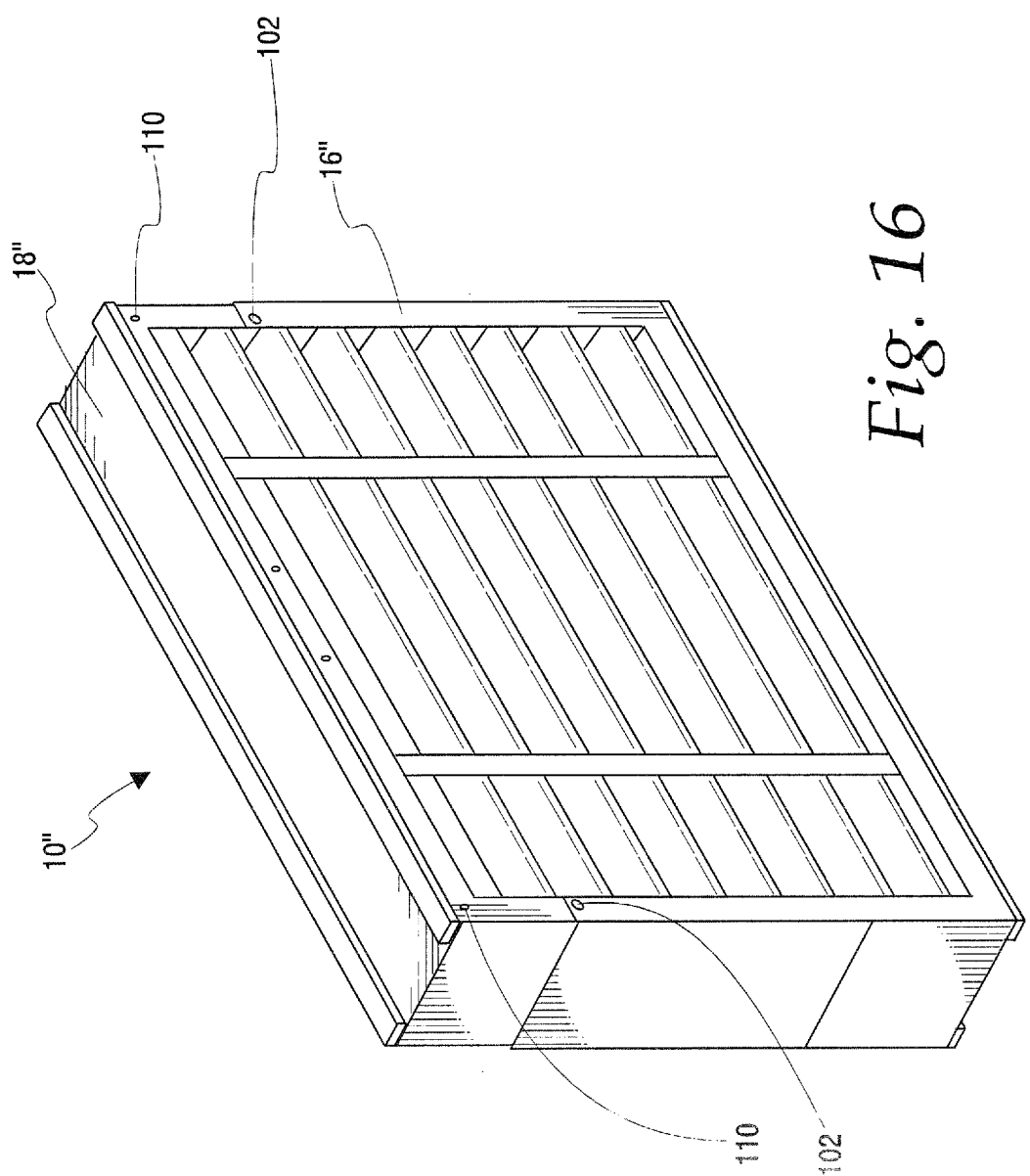
FIG. 16 is a view as in FIG. 15 wherein the fluid filter is changed into a second operative state corresponding to the second operative state for the fluid filter in FIG. 6.
Figure 17:
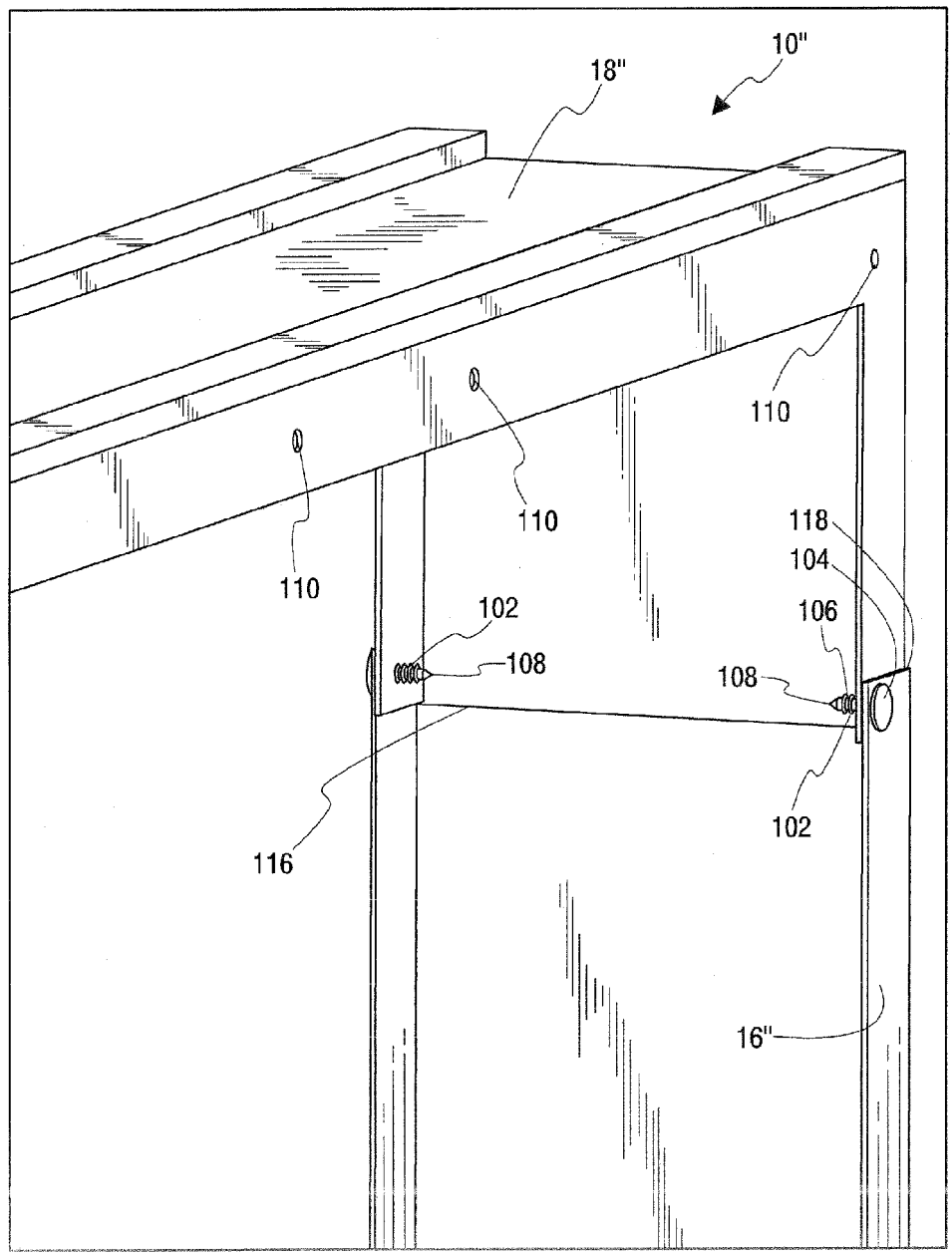
FIG. 17 is an enlarged, fragmentary, perspective view showing the connection location between frame assemblies with the filter in the FIG. 16 state.

In FIG. 16, the fluid filter 10" is shown in a second operative state, corresponding to the second operative state for the fluid filter 10 in FIG. 6. In this configuration, at least four clips/rivets 102 are provided, one each at four spaced locations; as depicted additionally in FIG. 17, adjacent to the bottom edge 116 of the second frame assembly 18" and the top edge 118 of the first frame assembly 16".

A typical installation will be described for the fluid filter 10" in FIGS. 18-20.

Figure 18:
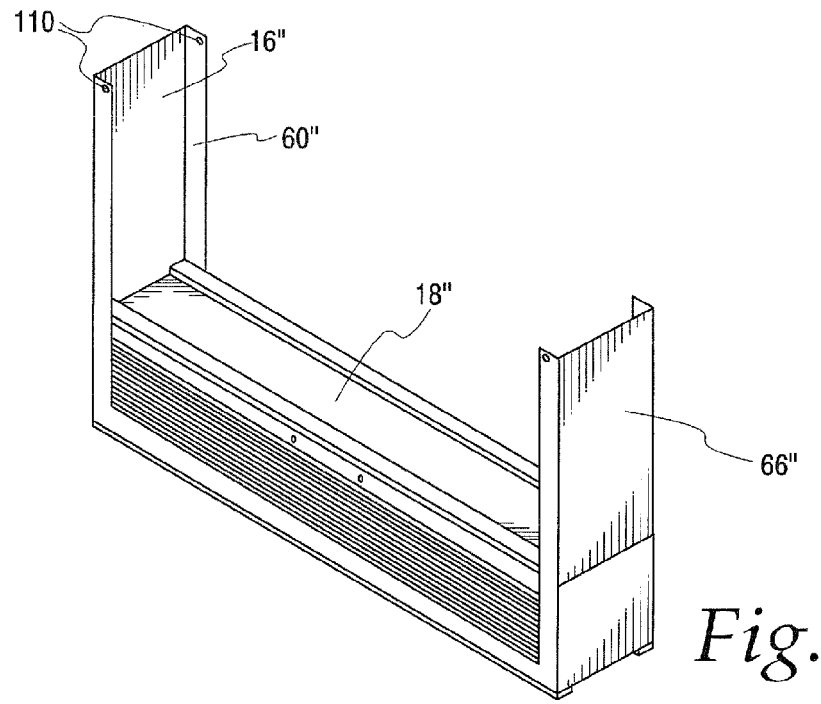

With the fluid filter 10" initially in the FIG. 14 state, the frame assembly 16" is reconfigured by unfolding the parts 60", 66" of the frame assembly 16", as shown in FIG. 18.

Figure 19:
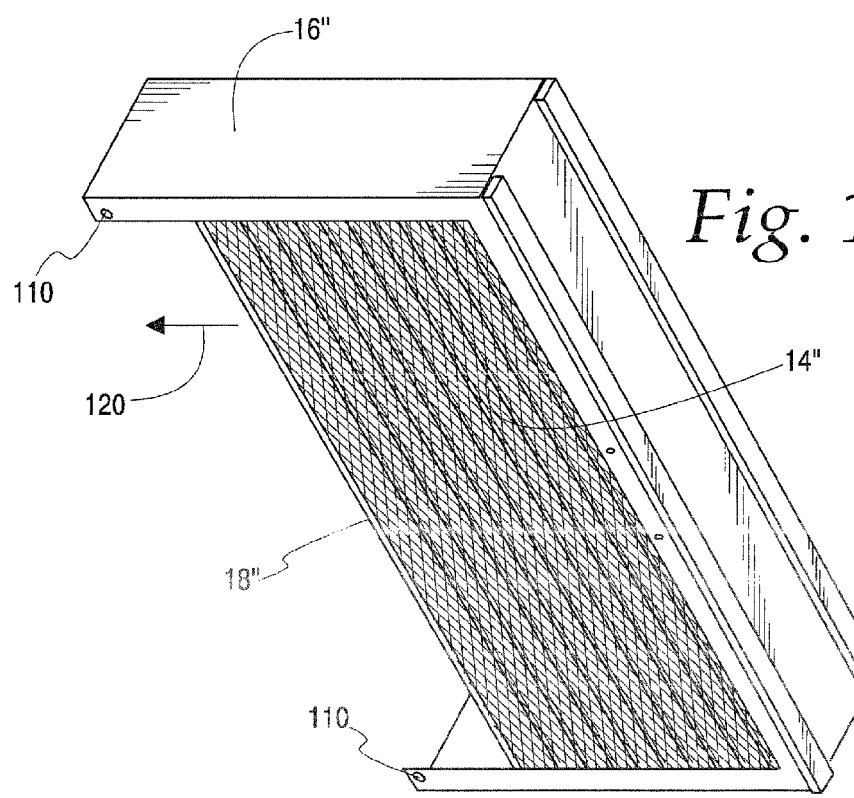

As shown in FIG. 19, the frame assembly 18" is translated in the direction of the arrow 120 relative to the frame assembly 16", thereby to expand the filter media 14".

In the event that the FIG. 15 configuration is desired, the holes 110 on the frame assemblies 16", 18" are aligned and the clips/rivets 102 inserted, as shown in FIG. 20. Indicia, shown as arbitrary matching marks "x", may be provided in the vicinity of the holes 110 to advise a user of the appropriate registration of holes 110 on the frame assemblies 16", 18" to produce the desired end configuration. These indicia may be used to assist placement of the fluid filter 10" in all different configurations contemplated.

Figure 22:
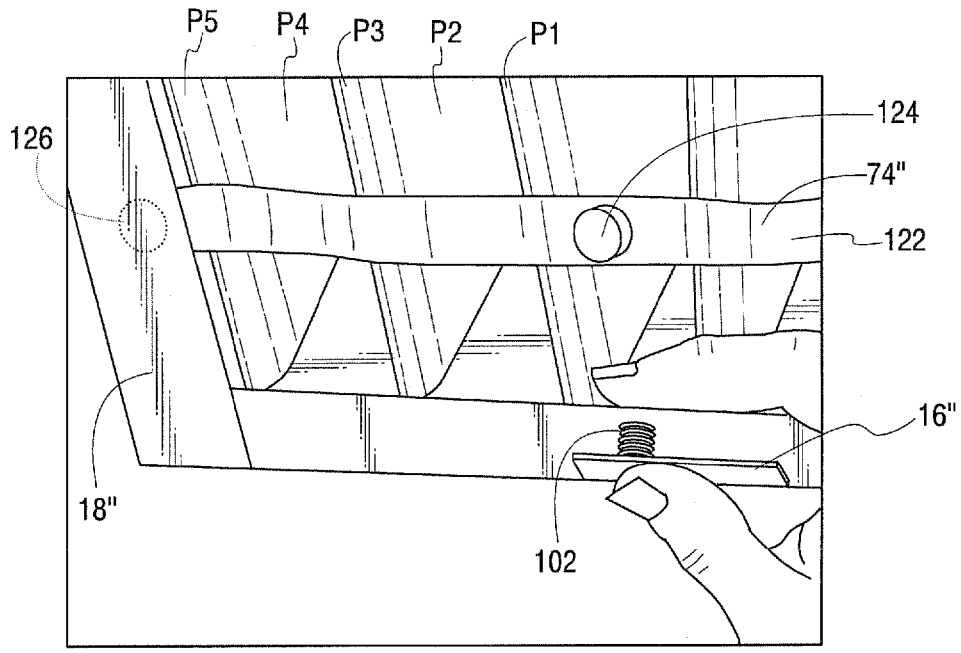

In FIGS. 21 and 22, a modified form of spacing component 74" is shown in the form of a flexible strip 122 having one component 124 of a hook-and-loop type fastener arrangement thereon, that cooperates conventionally with the other component 126 of a hook-and-loop type fastener on the frame assembly 18". Multiple pairs of these components 124, 126 may be used. With the fluid filter 10" in the FIG. 15 state, the spacing components 74", by reason of the connection of the components 124, 126, cause the panels P1, P2, P3, P4, P5 to be collapsed from their FIG. 22 configuration to allow the components 124, 126 to releasably engage, as shown in FIG. 21.

When it is desired to change the fluid filter 10" from the configuration shown in FIGS. 15 and 20 into the configuration shown in FIGS. 16 and 22, the components 122, 124 are released, as shown in FIG. 21, by pressing upon the strip 122 inwardly towards the filter media 14".

Figure 23:
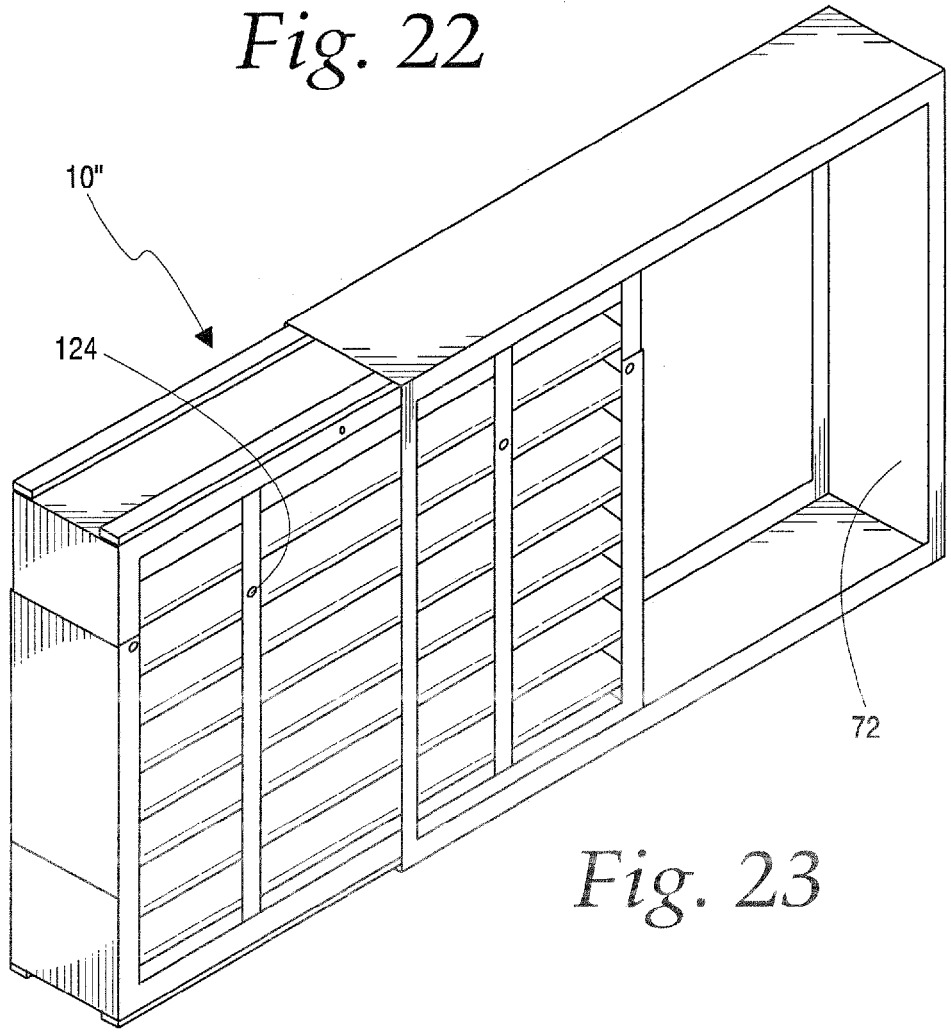
FIG. 23 is a perspective view of the fluid filter in the FIG. 16 state being directed into a holder/frame.

With the fluid filter 10" in the desired configuration, it is directed into the holder/frame 72, as shown in FIG. 23.

To assist monitoring of the filter state, a label 128, as shown in FIG. 14, may be applied strategically to be readily viewed by a user. The label 128 may have indicia thereon that prompts a user to provide information, such as "installation date", etc. Alternatively, the label 128 might have some type of reconfigurable structure that would allow the pertinent information to be easily presented by a user without requiring a marker, or the like.

Additional indicia at 130 may be provided to facilitate proper installation direction by a user.

The foregoing disclosure of specific embodiments is intended to be illustrative of the broad concepts comprehended by the invention.

The invention claimed is:

1. A fluid filter comprising:
a frame; and
filter media supported by the frame through which a fluid to be treated is directed,
the frame comprising at least first and second frame assemblies that are reconfigurable to place the filter selectively in: a) a first predetermined operative state; and b) a second predetermined operative state,
the frame cooperating with the filter media so that the filter media: i) extends over a first intake area with the filter in the first predetermined operative state; and ii) extends over a second intake area that is different than the first intake area with the filter in the second predetermined operative state.

2. The fluid filter according to claim 1 wherein the first and second frame assemblies are reconfigurable by guidingly sliding one against the other to thereby change the filter between the first and second operative states.

3. The fluid filter according to claim 1 wherein the first and second frame assemblies are reconfigurable to place the filter in a predetermined collapsed state.

4. The fluid filter according to claim 3 wherein a first part of one of the first and second frame assemblies is bent in a predetermined manner relative to a second part of the one of the first and second frame assemblies to reconfigure the one of the first and second frame assemblies to change the frame from one of the first, second and collapsed states into another of the first, second and collapsed states.

5. The fluid filter according to claim 2 wherein the first and second frame assemblies each has a "U" shape with the "U" shapes on the first and second frame assemblies opening oppositely.

6. The fluid filter according to claim 2 wherein there are discrete components on the first and second frame assemblies that cooperate with each other with the first and second frame assemblies in a first relative position with the filter in one of the first and second operative states.

7. The fluid filter according to claim 1 wherein the filter media has a pleated configuration with a plurality of panels folded in accordion style and further comprising a panel holding assembly to maintain a plurality of the panels together.

8. The fluid filter according to claim 1 wherein the filter media has a pleated configuration with a plurality of panels folded in accordion style, adjacent joined panels defining apices extending along generally parallel lines and further comprising at least one spacing component that spans across and is connected to a plurality of the apices.

9. The fluid filter according to claim 8 wherein the at least one component is elastically extendible in a line transverse to the parallel lines along which the apices extend.

10. The fluid filter according to claim 8 wherein the at least one spacing component is connected to each of the first and second frame assemblies.

11. The fluid filter according to claim 3 wherein the first and second frame assemblies cooperatively extend continuously around the intake areas with the filter in each of the first and second operative states and the collapsed state.

12. The fluid filter according to claim 4 wherein one of the first and second frame assemblies has a starting "U" shape with a base and spaced arms and with the filter in the collapsed state the one of the first and second frame assemblies is reconfigured from the starting "U" shape by bending one of the arms relative to the base to reside against the other of the first and second frame assemblies.

13. The fluid filter according to claim 12 wherein with the filter in the collapsed state the one of the first and second frame assemblies is reconfigured from the starting "U" shape by bending each of the arms relative to the base to reside against the other of the first and second frame assemblies.

14. The fluid filter according to claim 2 wherein one of the first and second frame assemblies has joined sections each with a length and at least one of the sections has a U-shaped cross-sectional configuration taken transverse to its length defined by a base wall and spaced side walls and a part of the other of the first and second frame assemblies resides between the spaced side walls with the filter in at least one of the first and second operative states.

15. The fluid filter according to claim 14 wherein the part of the other of the first and second frame assemblies has a cross-sectional configuration between the spaced side walls and taken transversely to the length of the at least one section that is U-shaped.

16. The fluid filter according to claim 1 further comprising an adhesive component with a peel-off backing that can be used to bond the first and second frame assemblies together.

17. The fluid filter according to claim 1 wherein the frame has an outer peripheral surface and further comprising at least one gasket component applied to the outer peripheral surface.

18. The fluid filter according to claim 1 wherein one of the first and second frame assemblies is made from a semi-rigid material with fold lines that allow the one of the first and second assemblies to be reconfigured by being bent in a predetermined manner.

19. The fluid filter according to claim 6 wherein there are discrete openings on the first and second frame assemblies that align with the first and second frame assemblies in a first relative position with the filter in one of the first and second operative states so as to accept a fastener.

20. The fluid filter according to claim 3 wherein the frame has a peripheral surface and the peripheral surface has a different length with the filter in each of the first and second operative states and the collapsed state.

* * * * *